May 29, 1956

J. T. BROWN 2,747,497

BARBECUING APPARATUS

Filed June 12, 1952

JAY T. BROWN,
INVENTOR.

BY  *Eaton + Bell*

ATTORNEY

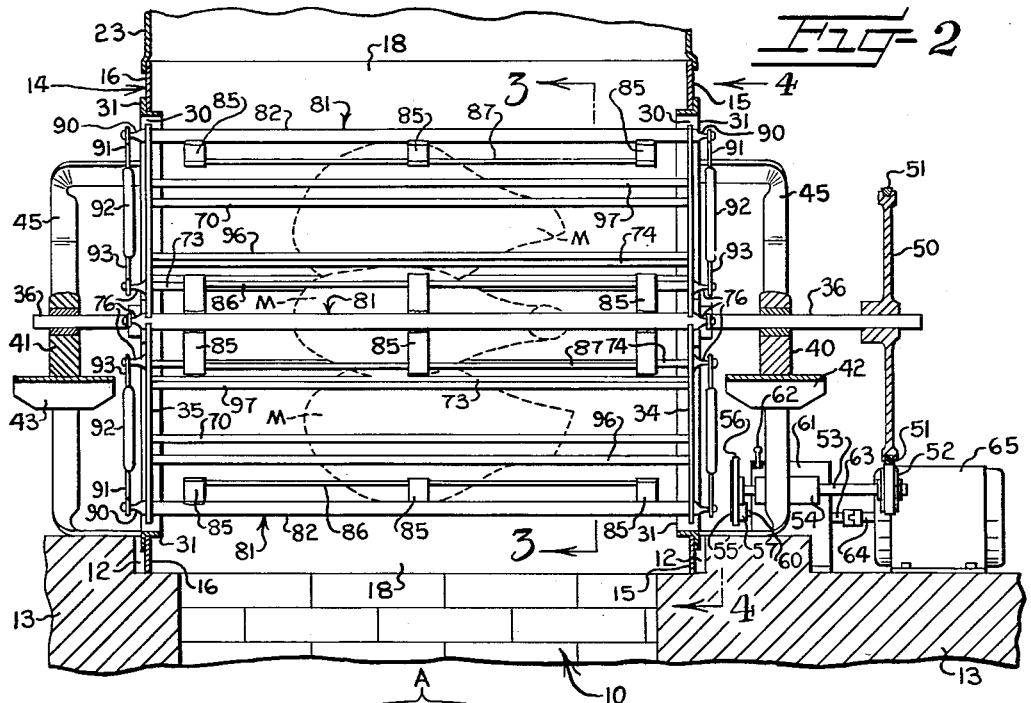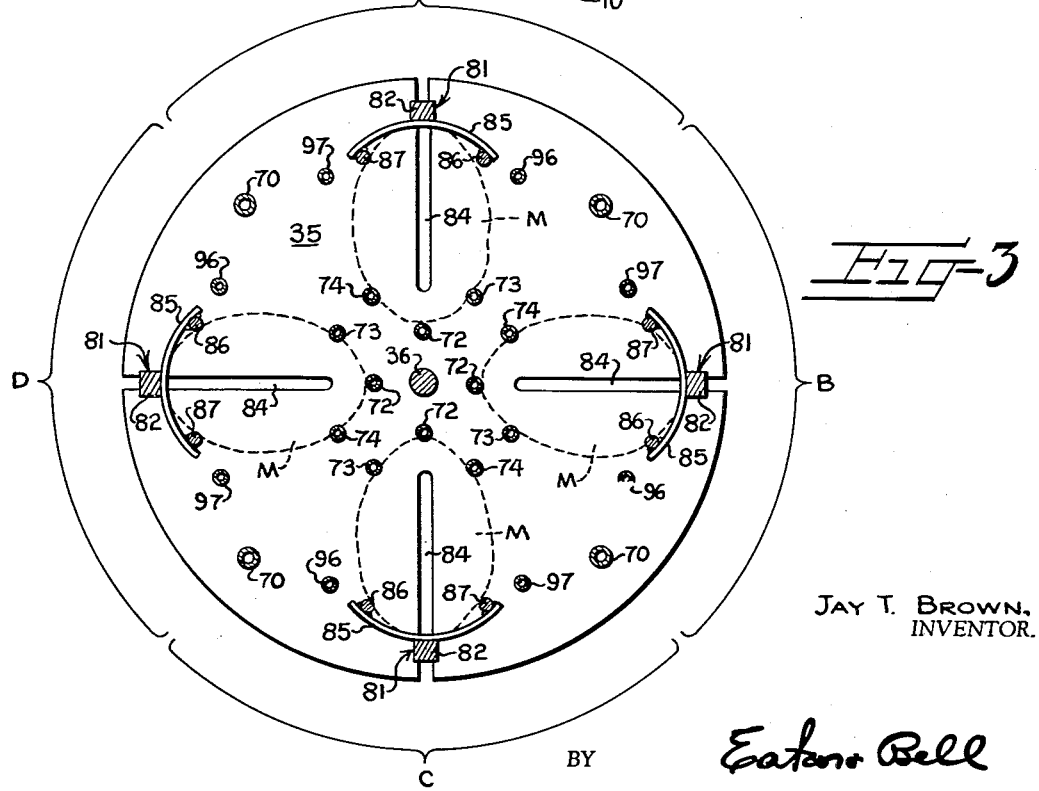

May 29, 1956  J. T. BROWN  2,747,497
BARBECUING APPARATUS
Filed June 12, 1952  4 Sheets-Sheet 3
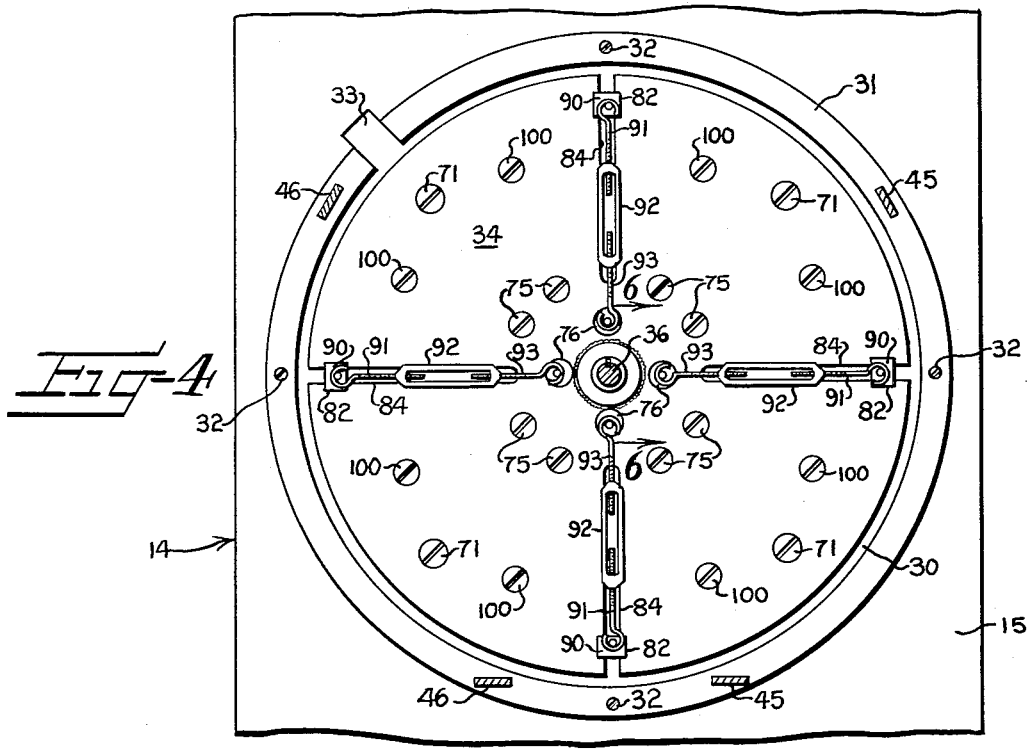
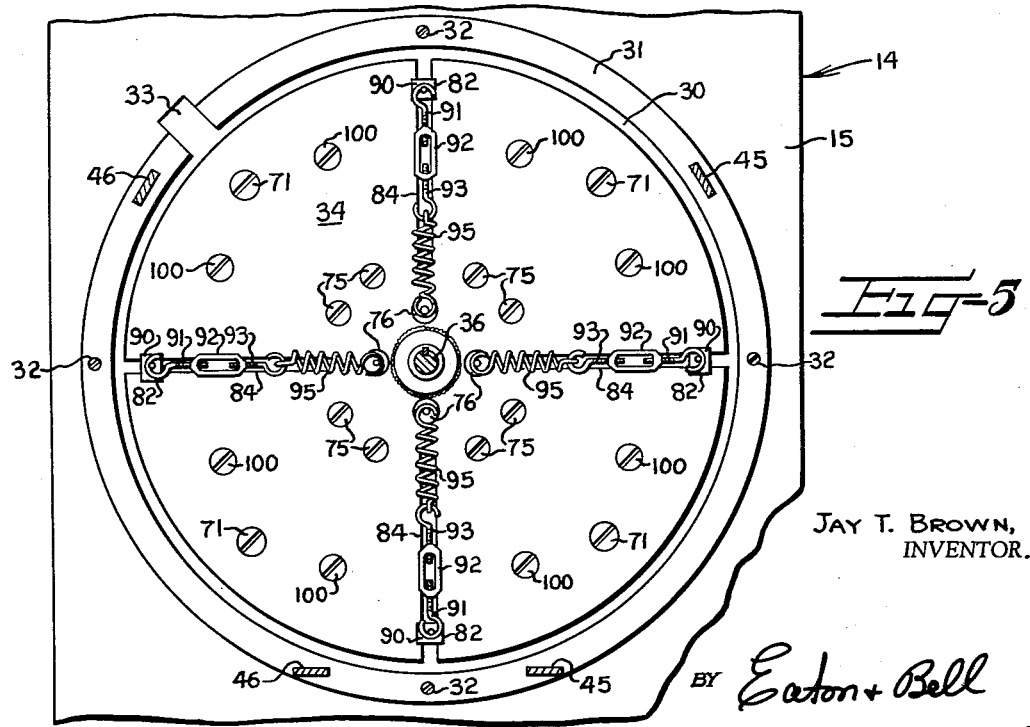
JAY T. BROWN,
INVENTOR.
BY Eaton + Bell
ATTORNEYS May 29, 1956  J. T. BROWN  2,747,497
BARBECUING APPARATUS
Filed June 12, 1952  4 Sheets-Sheet 4
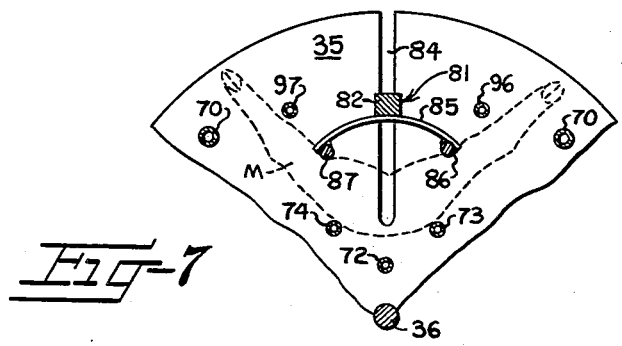
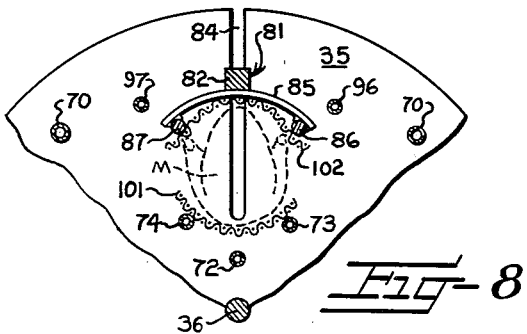
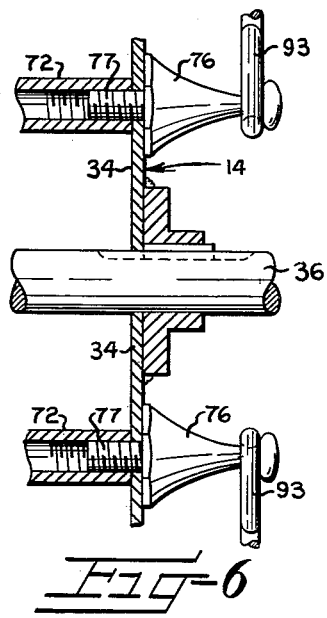
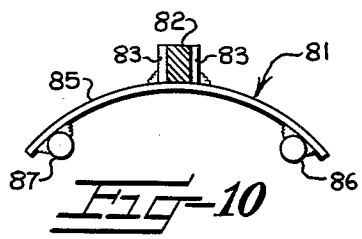
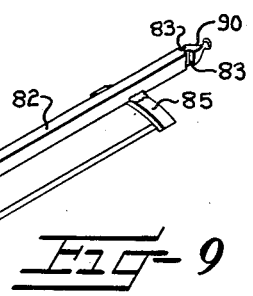
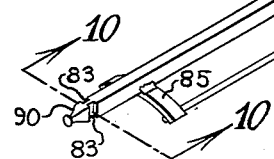
JAY T. BROWN,
INVENTOR.
BY Eaton + Bell
ATTORNEYS

United States Patent Office 2,747,497
Patented May 29, 1956

2,747,497

BARBECUING APPARATUS

Jay T. Brown, York, S. C.

Application June 12, 1952, Serial No. 293,156

4 Claims. (Cl. 99—427)

This invention relates to an improved barbecuing apparatus and the primary object of the invention is to provide a barbecuing apparatus having rotatable means for supporting whole dressed animal carcasses, and various sizes of meat or other edibles and wherein the necessity of piercing the articles to be roasted or barbecued is obviated.

To applicant's best knowledge, all of the various barbecuing apparatuses heretofore in use included one or more spits on which dressed carcasses, such as beef, pork, fowl and the like, have been impaled, the spit usually piercing the article to be roasted substantially longitudinally thereof with the result that, during the roasting or barbecuing process, the juices or fats of the meat or other article being barbecued would escape from the article around the spit or spits. Generally this has resulted in a decrease in the weight of the meat being roasted or barbecued of around thirty-five per cent, due, primarily, to the spit penetrating the article being roasted or barbecued, thus allowing escape of fluids. Obviously, this also dries out the article being cooked with a resulting loss of flavor and taste.

Accordingly, it is an object of this invention, to provide an improved means for supporting various sizes of meat portions, carcasses and the like for roasting or barbecuing comprising a driven rotatable cage reel having a series of circularly arranged cages thereon formed from relatively small rods or bars or from perforated or mesh material and wherein certain of the bars or perforated or mesh material are fixed relative to the cage reel proper and others of the bars or perforated or mesh material associated with each basket are movable either resiliently or adjustably relative to the fixed bars or material. Thus, an article to be roasted or barbecued may be placed in each of the baskets and the movable rods or material may then be positioned against the opposite portion of the article to be roasted or barbecued relative to the portion thereof which rests upon the stationary fixed bars or rods to thus clamp the article to be roasted or barbecued in the corresponding cage. The cage reel is mounted for rotation above the heat source and, as the reel rotates, the cages rotate therewith thus subjecting the entire exterior of each of the articles carried by the cages to the heat source. This obviates the necessity of piercing the article to be roasted or barbecued.

The cages serve to clamp or press the article being barbecued which helps retain the natural juices therein. As a consequence of this and the fact that the article is not pierced, only a very small amount of weight is lost in the cooking process. This results in a juicier cooked article having greater weight with a resultant saving to the processor.

When meat and the like is barbecued or roasted by conventional spit means, there is usually no metal or the like in contact with the outer surface of the article being cooked with the result that natural juices and basting fluids drip from the article being cooked rather than penetrate the same. In using the cages of the present invention, fluids on the outer surfaces of the articles being cooked flow along the contacting portions of the cages and are thus spread evenly over the article for maximum penetration thereof.

Some of the objects of the invention having been stated, other objects will appear as the description proceeds, when taken in connection with the accompanying drawings, in which—

Figure 2 is an enlarged fragmentary longitudinal vertical sectional view through the improved apparatus taken substantially along the line 2—2 in Figure 1;

Figure 3 is an enlarged vertical sectional view taken substantially along the line 3—3 in Figure 2 and showing the improved cage reel disassociated from the housing of the apparatus;

Figure 4 is an enlarged end view of the improved cage reel looking substantially along the line 4—4 in Figure 2 with parts in section;

Figure 5 is a view similar to Figure 4 showing slightly modified means for applying pressure to the articles being roasted or barbecued;

Figure 6 is an enlarged fragmentary vertical sectional view taken substantially along the line 6—6 in Figure 4;

Figure 7 is a fragmentary elevation, with parts in section, similar to the upper central portion of Figure 3, but illustrating the manner in which a different type of article is supported by the cage reel;

Figure 8 is a view similar to Figure 7 showing still another type of article supported in one of the cages of the cage reel;

Figure 9 is an isometric view of one of the sets of movable means for applying pressure to the article supported by the cage reel and for clamping the article therein;

Figure 10 is an enlarged elevation, partly in section looking along the line 10—10 in Figure 9.

Figure 1:
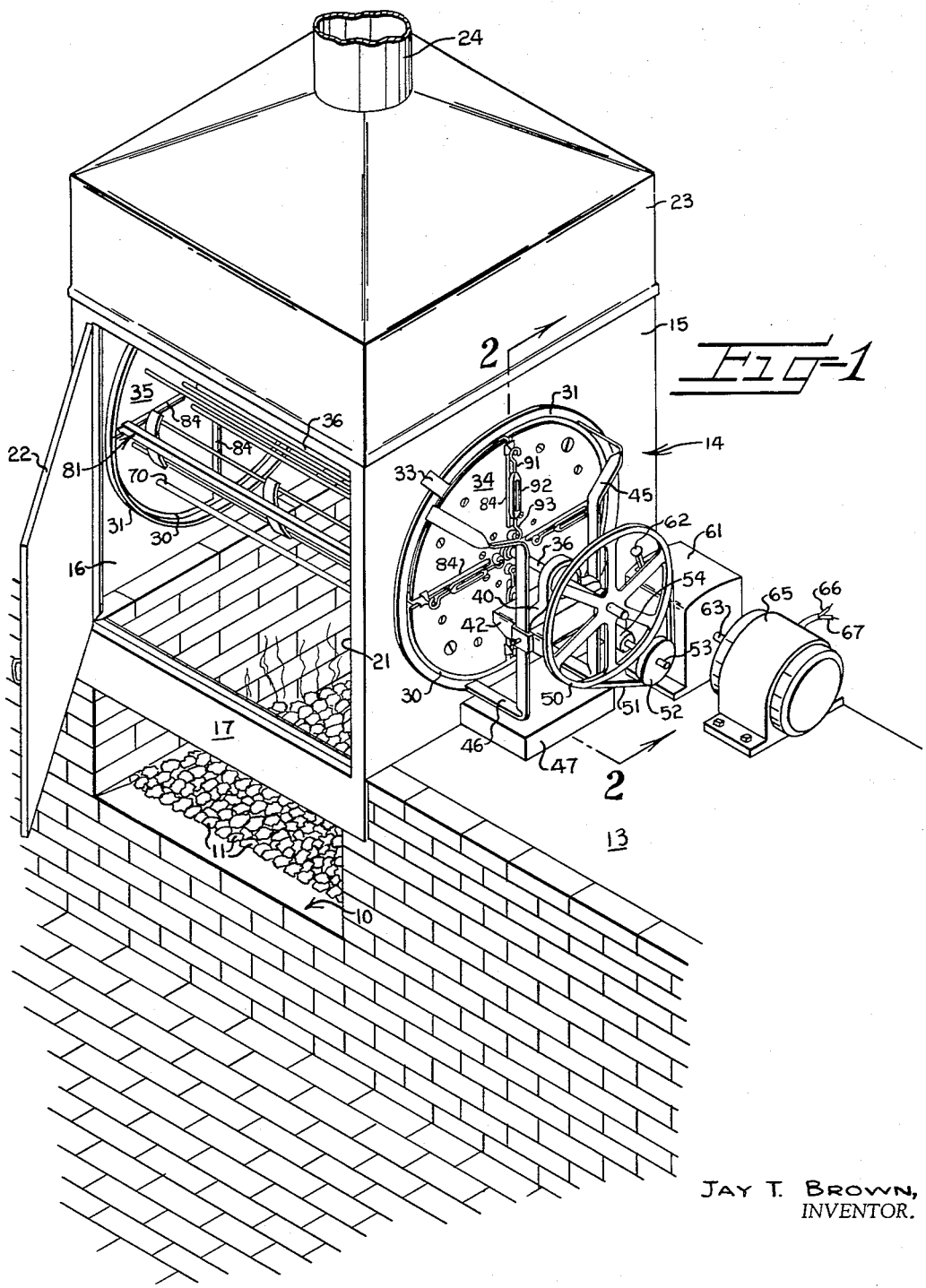
Figure 1 is an isometric view of the barbecuing apparatus showing the preferred embodiments thereof.

Referring more specifically to the drawings, there is shown a substantially rectangular-shaped walled fire box or pit 10 having a suitable heat source or fire bed 11, which fire bed or heat source may comprise any suitable fuel such as coals of charcoal, hard wood or the like. It is preferable that a planar platform 13 be provided at opposite sides of the pit or fire box 10 and these platforms 13 are each provided with a recess or groove 12 at their juncture with the walls of the fire box 10 to accommodate the present barbecuing apparatus. Mounted in the recesses 12 and communicating with the fire box 10 is a substantially rectangular-shaped cage reel housing or casing broadly designated at 14 and which comprises opposite end walls 15 and 16, a front wall 17 and the rear wall 18 which are suitably joined together and which are preferably made from stainless sheet steel. The front wall 17 is provided with an access opening 21 which is normally closed by a hinged door 22 preferably made from a transparent refractory material so the object being barbecued may be viewed during the barbecuing or roasting process.

A hood 23 of any suitable construction is fixed on the upper edges of the walls 15 to 18, inclusive, of the housing 14 and has a stack or pipe 24 communicating with the upper end thereof to permit the smoke and fumes to escape from the housing 14.

Each of the end walls 15 and 16 of the casing 14 has a relatively large circular opening 30 therein which are each framed by a circularly formed angle bar 31 for reinforcing purposes, since the walls 15 and 16 are preferably made from a relatively thin material. The circularly formed angle bars 31 are suitably secured to the corresponding walls 15 and 16 by any suitable means such as flat-head screws 32.

The end wall 15 is also provided with a substantially rectangular slot or opening 33 therein which communicates with the corresponding opening 30. A slot similar to the slot 33 may also be provided in the wall 16, but is not required. The purpose of the slot 33 will be later described.

The circular angle bars 31 in the openings 30 in the walls 15 and 16 circumscribe respective circular head members or reel end plates 34 and 35 respectively of an improved cage reel embodying the improved means for supporting the articles as they are barbecued or roasted.

The head members or plates 34 and 35 are of identical construction and are keyed or otherwise secured on a reel shaft or axle 36. Opposite ends of the axle 36 extend substantially beyond the corresponding head plates 34 and 35 (Figures 1 and 2) and are rotatably mounted in bearing blocks 40 and 41 fixed to transverse bearing supports 42 and 43. Each of the bearing supports 42 and 43 is mounted for vertical adjustment between a pair of substantially upright brackets 45 and 46, the lower end of each of which rests upon a support block 47. These brackets 45 and 46 are bent inwardly at their lower ends and are suitably secured, as by welding, to the corresponding circular frame member 31. The upper ends of the brackets 45 and 46 extend outwardly and upwardly in diverging relation and then inwardly and are also suitably secured to the corresponding circular frame member 31 to thereby rigidly support the corresponding bearing blocks 40 and 41 in spaced relation to the reel ends 34 and 35.

In order to drive the reel shaft 36 at varying speeds, the shaft 36 has a relatively large V-pulley 50 thereon which is engaged by a V-belt 51 also mounted on a relatively small V-pulley 52. The V-pulley 52 is fixed on a shaft 53 rotatably mounted in a bearing block 54 fixed to the corresponding bracket 45. The inner end of the shaft 53, that is, the end of shaft 53 adjacent the reel head 34, has a V-pulley 55 fixed thereon on which a V-belt 56 is mounted. The V-belt 56 is also mounted on a relatively small V-pulley 57 fixed on shaft 60 extending from a suitable variable speed driving unit 61.

There are many different types of manually controlled variable speed driving units which may be employed in the capacity of the unit 61 and, therefore, a detailed description thereof is deemed unnecessary. The variable speed driving unit 61 has a suitable control handle 62 projecting therefrom for controlling the speed of the output shaft 60 relative to the speed of an input shaft 63 coupled to a motor shaft 64 extending from an electric motor 65. The electric motor 65 has wires 66 and 67 extending therefrom to a suitable source of electrical energy not shown. The electric motor 65 and the variable speed driving unit 61 rest upon, and may be suitably secured to the platform 13.

The housing and driving means may be of any desired type and those shown are for purposes of illustration only.

Now, referring particularly to Figure 3, it will be observed that the end plates 34 and 35 of the cage reel are connected to opposite ends of a plurality of rods or shafts so arranged as to form article cages.

In the instant illustration, there are four cages shown in Figure 3 which are arranged in a circle and are equally spaced from each other. For purposes of illustration of the areas embraced by the cages, the basket reel is divided into segments or quadrants indicated at A, B, C and D. These areas defined by the brackets A, B, C and D are termed segments, since it is evident that a greater or lesser number of cages may be provided depending upon the size of the cages required and the relative size of the end plates 34 and 35 of the cage reel.

The junctures of adjacent segments are defined by a plurality of circularly spaced tie rods 70 which are shown in the form of tubes or pipes fixed at opposite ends thereof adjacent the outer periphery of the plates 34 and 35 and secured thereto by any suitable means such as screws 71 which slidably penetrate the end plates 34 and 35 and are threaded into the opposite ends of the tubular tie rods 70.

Each of the cages defined by the segments A, B, C and D comprises a plurality of inner fixed rods, bars or shafts, there preferably being three rods or bars associated with each of the cages and being indicated at 72, 73 and 74. It will be noted that the innermost of the fixed cage bars 72 is spaced radially from the axle 36 and the other bars 73 and 74 are spaced outwardly from opposite sides of an imaginary line extending radially from the axle 36 through the center of the innermost bar 72 and the bars 73 and 74 are also spaced a greater distance from the axle shaft 36 than the centermost basket bar 72.

Thus, the fixed bars 72, 73 and 74 collectively define a substantially triangular or concave inner cage. The fixed cage bars 72, 73 and 74 are also preferably tubular in cross section and extend between and are suitably secured to the end plates 34 and 35 as, by screws 75. However, opposite ends of the innermost bar 72 are secured to the end plates 34 and 35 by corresponding anchor members 76 each of which is provided with a reduced threaded portion 77 which slidably penetrates the corresponding end plate and is threadably embedded in the corresponding end of the tubular bar 72. The purpose of these anchor members 76 will be later described.

Now, as heretofore stated, each of the groups of fixed bars 72, 73 and 74 define the bottom of a corresponding cage and in which an article M, such as a ham portion, a fowl, an animal carcass or the like may be positioned as shown in Figures 3, 7 and 8. In order to retain the corresponding articles to be roasted or barbecued in the cages, an upper cage portion is provided for each of the cages in the form of an adjustable and/or resilient clamping means indicated broadly at 81.

As shown in Figure 9, each of the clamping units 81 comprises a guide bar 82 which is preferably, but not necessarily, rectangular in cross section and the opposite end portions of which are provided with a pair of guiding grooves 83 on opposite sides thereof. The end plates 34 and 35 are each provided with a plurality of radially extending slots 84 which are open at their outer ends and each slot 84 is of such width that the side walls thereof fit in the corresponding guiding grooves 83 in opposite ends of the bars 82 to permit the bars 82 to be moved radially in the slots 84.

Each of the bars 82 has a plurality of transversely extending ribs 85 suitably secured to the inner surface thereof as by welding. These ribs 85 are preferably arcuate and may be of resilient material if desired.

It will be observed in Figures 2 and 9 that the outermost of the ribs 85 are spaced substantially inwardly from the outer ends of each of the bars 82 and opposite ends of the ribs 85 have article clamping rods or bars 86 and 87 suitably secured thereto and spanning the distance between the outermost of the ribs 85. A reduced anchor portion 90 is provided on each end of each of the clamping unit support 82, and suitable connecting means connect the anchor portions 90 of each cage with the corresponding anchors 76 for holding the upper cage portions 81 in clamping engagement with the article being roasted or barbecued. One form of connecting means is illustrated in Figures 1, 2 and 4 and comprises a hooked rod 91 which engages the corresponding anchors 90 and extends inwardly radially and threadably penetrates one end of a turnbuckle 92. The inner end of each of the turnbuckles 92 has the outer threaded end of a thrust rod 93 threaded therein.

Now, in the form of connecting means for applying pressure to the clamping units 81, shown in Figure 4, the innermost hooked member 93 is connected to the corresponding anchor 76 on each of the end plates 34 and 35. The form of pressure applying means for the clamping units 81 shown in Figure 5 is very similar to that shown in Figure 4 and like parts bear like reference characters.

The form shown in Figure 5 differs from that shown in Figure 4 in that the turnbuckle 92 is preferably shorter than that shown in Figure 4 and the innermost hooked member or rod 93 had the outer end of a tension spring 95 connected thereto, the inner end thereof being connected to the corresponding anchor member 76.

*Method of operation*

In order to illustrate clearly the manner in which the improved barbecuing apparatus is used, a relatively large article, such as a ham, is shown in each of the cages in Figures 2 and 3 and an irregularly-shaped article such the carcass of a pig or hog is shown in one of the cages in Figure 7 and a relatively small article such as a chicken or other fowl is shown in one of the cages in Figure 8. In each instance, the articles to be barbecued or roasted are indicated at M.

Assuming that an article to be barbecued or roasted of substantially the shape of that shown in Figures 2 and 3 is to be mounted in each of the cages of the cage reel, the clamping unit 81 is first removed from each of the cages by rotating the reel, including the end plates 34 and 35, until the corresponding radially extending slot 84 in the plate 34 is in alinement with or registers with the slot or opening 33. The reel may be rotated manually or the electric motor 65 may be used for this purpose.

The hooked rods 91 are then removed or disengaged from opposite ends of the corresponding bar 82, whereupon the bar 82 is moved out of the corresponding slots 84 and into the opening 33. The operator then moves the bar 82 outwardly through the opening 33 and, since the opening 33 is of substantially greater width than the corresponding bar 82, the operator may then swing the opposite end of the bar 82 outwardly to remove the same through the opening 21 in the housing 14. An article M is then placed upon the fixed rods or bars 72, 73 and 74 and cradled therebetween substantially as shown in Figure 3. In order to assist the operator in properly placing the article M on the rods 72, 73 and 74, each of the cages also comprises at least a pair of transversely spaced longitudinally extending rods 96 and 97 which may be termed as guide members and which are also preferably, but not necessarily, of the same structure as the fixed rods 72, 73 and 74 and are suitably secured to the end plates 34 and 35, as by screws 100. All of the screws 71, 75 and 100 are preferably flathead screws having their outer surfaces flush with the outer surfaces of the corresponding end plates 34 and 35 in order to facilitate cleaning of the apparatus.

It will be noted that the guide members or bars 96 and 97 are spaced substantially further apart than the fixed rods 73 and 74 and are also spaced equi-distant from opposite sides of the corresponding slots 84. Thus, as the article M, of substantially the shape shown in Figures 2 and 3, is cradled in the rods 72, 73 and 74, the article M may rest against one or the other or both of the rods 96 and 97 until the corresponding clamping unit 81 is pushed against the outer surface thereof.

After each of the articles M have been placed in the corresponding cage in the manner heretofore described, the corresponding clamping unit 81 is reinstalled in the reverse manner to that described for removing the same from the slots 84 and the end plates 34 and 35. Of course, the hooked rods 91 and 93 would then be loosely mounted on the corresponding anchors 90 and 76 in the form of pressure applying means shown in Figure 4, or in the instance of the pressure applying means of the type shown in Figure 5 being employed, the corresponding spring 95 may be stretched by the operator to position the outermost hooked rods 91 in engagement with the anchor portions 90 on opposite ends of the clamping unit 81. In either event, the turnbuckle 92 would then be rotated to move the hooked rods 91 and 93 toward each other to thereby apply inward pressure on the corresponding clamping unit 81 to push the corresponding article M against the cage base rods 72, 73 and 74 thus clamping each of the articles M in the corresponding cage.

The electric motor may then be energized and the speed to effect rotation of the reel may be controlled by the control handle or lever 62 according to the size and type of meat or the like to be roasted or barbecued. It may be desirable to rotate the cages as slow as six revolutions per minute during the barbecuing of a relatively large portion of meat such as the ham shown in Figures 2 and 3. On the other hand, upon relatively small articles being barbecued such as chickens or other fowls shown in Figure 8, it may be desirable to rotate the cages at a substantially greater speed. The most important feature of the present apparatus is the fact that it is not necessary to pierce the article in order to properly support the same during the barbecuing or roasting process, thus, avoiding a considerable loss in the juices or fats inside the article M. Also, since the articles M are circularly arranged, the juices or fats from one article will fall onto the adjacent article therebelow to further enhance the flavor thereof and by cooking the fats or other juices into the articles roasted or barbecued.

Although the type of pressure applying means shown in Figure 4 operates satisfactorily, the type of pressure applying means shown in Figure 5 has the advantage of compensating for any decrease in the size of the corresponding article as it is being barbecued thus obviating the necessity of clamping the article being barbecued quite as tightly as is necessary when the spring 95 is not employed.

In Figure 7, the article shown is representative of a dressed carcass and it will be observed that the rods 96 and 97 are utilized for maintaining separation of the legs or flanks of the carcass to hold the carcass against the rods 73 and 74 while the clamp 81 is installed and also to maintain the leg or flank of the carcass in a separated position during the barbecuing or roasting process.

In roasting or barbecuing relatively small articles such as chickens and other fowls and the like as shown in Figure 8, an opened-mesh screen 101 or other suitable means may be positioned against and span the distance between the rods 72 and 73 to prevent the article from falling between the rods 72 and 73. After the article M is placed upon the screen 101 and before the clamping unit 81 is moved into clamping position, a similar net such as a opened-mesh metal screen 102 may be positioned upon the article M for engagement by the radially movable rods 86 and 87 of the corresponding clamping unit 81.

Of course, if the barbecuing apparatus is to be used solely for barbecuing relatively small articles, such as fowls and the like, it is evident that the strips of metal screen material 101 and 102 or the like may be fixed to the corresponding set of rods 73, 74 and 86, 87 as by welding.

In order to facilitate cleaning of the entire apparatus it is preferable that all the parts thereof be made from stainless steel. However, any desired type of material may be used.

It is thus seen that I have provided an improved barbecuing apparatus which is so arranged that it will accommodate substantially any size of meat, and will permit barbecuing or roasting of meat at substantially greater savings to the operator than barbecuing apparatus heretofore employed and thus giving a juicier and a substantially better flavored product than that resulting from barbecuing apparatus heretofore in use.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a barbecuing apparatus having a housing and a driven rotatable reel mounted therein and wherein the reel includes reel heads fixed on each end of a reel axle, means in association with said reel for holding articles of meat and the like for cooking the same without piercing comprising a plurality of groups of inner fixed cage elements secured to said reel in circularly-spaced relation around said reel axle and each group being formed from a plurality of longitudinally extending spaced rods having their ends secured to said reel heads, said reel heads having a plurality of radially extending slots therein communicating with the periphery of said reel heads and being spaced from the axis of said reel heads, there being one of said slots in each of said reel heads for each of said fixed cage elements disposed between said reel heads, a plurality of outer movable cage elements slidably mounted in said slots, there being one of said movable cage elements for each group of said fixed cage elements, said movable cage elements comprising a plurality of longitudinally extending members and a plurality of arcuate members secured to the longitudinally extending members, and means for resiliently clamping the movable cage elements against articles positioned in the fixed cage elements.

2. In a barbecuing apparatus having a housing and a driven reel rotatably mounted therein and wherein said reel includes reel heads, an improved article holding means in association with said reel comprising a plurality of groups of inner article holding elements, each group of inner article holding elements including a plurality of arcuately arranged bars fixed between said reel heads adjacent the axis of the reels in circumferentially spaced relation thereto, a plurality of outer article holding elements extending between said reel heads and being slidably mounted therein for radial movement toward and away from the axis of the reel, there being one of said movable outer article holding elements for each of said groups of fixed inner article holding elements, each of said outer movable article holding elements being adjustable relative to its corresponding inner fixed article holding element to accommodate and firmly clamp articles of various sizes, and resilient clamping means normally urging the outer article holding elements toward their respective inner fixed article holding elements to clamp articles positioned therebetween for cooking without piercing the articles.

3. In a barbecuing apparatus having a housing and a driven rotatable reel mounted therein and wherein the reel includes reel heads fixed on each end of a reel axle, means in association with said reel for holding articles of meat and the like for cooking the same without piercing, said means comprising a plurality of groups of fixed inner article holding elements secured to the reel heads and extending therebetween in circular spaced relation around the reel axle, said reel heads having a plurality of radially extending slots therein communicating with the periphery of said reel heads and each of said slots terminating adjacent one of said groups of inner article holding means, a plurality of outer holding elements extending between said reel heads, each of said outer holding elements being slidably mounted in one of the slots in each of the reel heads, and means adjustably connecting said outer article holding elements to said inner article holding elements to clampingly engage articles of various sizes positioned therebetween.

4. A structure according to claim 3 wherein said last-named means comprises anchor portions secured to the ends of said outer holding elements and extending outwardly therefrom through the slots in the reel head, an adjustable turnbuckle extending radially from each of said anchor portions toward the axis of the reel, and means securing the inner ends of the turnbuckles to the reel head adjacent the inner article holding elements.

References Cited in the file of this patent

UNITED STATES PATENTS

| | | |
|---|---|---|
| 882,787 | Malloy | May 24, 1908 |
| 1,359,749 | Schey | Nov. 23, 1920 |
| 1,456,958 | Wolf | May 29, 1923 |
| 1,476,215 | Pace | Dec. 4, 1923 |
| 1,740,729 | Garvis | Dec. 24, 1929 |
| 2,039,541 | Lekometros | May 5, 1936 |
| 2,058,172 | Myers | Oct. 20, 1936 |
| 2,144,918 | Garvis | Jan. 24, 1939 |
| 2,297,825 | Bobo | Oct. 6, 1942 |
| 2,320,304 | Rosset | May 25, 1943 |
| 2,348,545 | Kahn | May 9, 1944 |
| 2,431,253 | Hoy | Nov. 18, 1947 |